(12) United States Patent
Baccaro

(10) Patent No.: US 10,889,042 B2
(45) Date of Patent: Jan. 12, 2021

(54) PROCESS FOR THE PRODUCTION OF STRETCH FILM

(71) Applicant: SABIC Global Technologies B.V., Bergen op Zoom (NL)

(72) Inventor: Lucio Baccaro, Maastricht (NL)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 219 days.

(21) Appl. No.: 15/756,292

(22) PCT Filed: Sep. 1, 2016

(86) PCT No.: PCT/EP2016/070618
§ 371 (c)(1),
(2) Date: Feb. 28, 2018

(87) PCT Pub. No.: WO2017/042086
PCT Pub. Date: Mar. 16, 2017

(65) Prior Publication Data
US 2018/0281261 A1    Oct. 4, 2018

(30) Foreign Application Priority Data

Sep. 7, 2015 (EP) .................................... 15184090

(51) Int. Cl.
| | |
|---|---|
| *B29C 48/19* | (2019.01) |
| *B29C 48/08* | (2019.01) |
| *B29C 48/21* | (2019.01) |
| *B29C 48/305* | (2019.01) |
| *B29K 23/00* | (2006.01) |

(52) U.S. Cl.
CPC ............. *B29C 48/19* (2019.02); *B29C 48/08* (2019.02); *B29C 48/21* (2019.02); *B29C 48/305* (2019.02); *B29K 2023/0625* (2013.01); *B29K 2023/0633* (2013.01)

(58) Field of Classification Search
CPC . B29C 48/19; B29C 48/08; B29K 2023/0625; B29K 2023/0633
See application file for complete search history.

(56) References Cited

U.S. PATENT DOCUMENTS

| | | | |
|---|---|---|---|
| 4,731,004 A | 3/1988 | Wenz, Jr. | |
| 5,128,212 A * | 7/1992 | Kneale | B29B 17/0005 156/244.11 |
| 5,236,642 A | 8/1993 | Blemberg et al. | |
| 5,451,357 A | 9/1995 | Cloeren | |
| 2012/0219814 A1 | 8/2012 | Vignola et al. | |
| 2016/0032035 A1* | 2/2016 | Malakoff | C08F 210/16 526/348.5 |

FOREIGN PATENT DOCUMENTS

| | | |
|---|---|---|
| EP | 1935909 A1 | 6/2008 |
| WO | 2006094723 A1 | 9/2006 |

OTHER PUBLICATIONS

Kelly Frey. The Use of Encapsulation Dies for Processing Linear Polyolefin Resins. 2000 TAPPI Polymers, Laminations, & Coatings Conference. pp. 709-721. (Year: 2000).*
"SML New high-performance stretch film line," Chemical Fibers International, IBP Press, Frankfurt AM Main, DE, vol. 63, No. 3, Sep. 2013, p. 177, ISSN: 0340-3343.
International Search Report for International Application No. PCT/EP2016/070618; International Filing Date: Sep. 1, 2016; dated Oct. 5, 2016; 6 Pages.
K.R. Frey et.al., "The use of encapsulation dies for processing linear polyolefin resins in extrusion coating," in Proceedings of the ANTEC, Dallas, May 6-10, 2001; 6 Pages.
Krumm K, Plastics, Rubber and Composites Processing and Applications, vol. 20, No. 4, p. 193-200 (1993).
Oliver, "The use of encapsulation dies for processing linear polyolefin resins in extrusion coating," Proceedings of the 2000 Tappi Polymers, Laminations, and Coating Conference—Aug. 27, 2000 to Aug. 31, 2000, Jan. 2000, pp. 1227-1236, ISSN: 1047-305X.
Peacock, Andrew J., "Handbook of Polyethylene, Chapter 3 Production Processes", 2000, Marcel Dekker, Inc., New York; ISBN 0824795466; p. 43-66.
Robert Colvin, "Technology Tackles Material and Energy Costs in Film Extrusion," Modern Plastics International, McGraw-Hill, Inc. Lausanne, CH, Oct. 2006, pp. 34-39, ISSN: 0026-8283.
Written Opinion of the International Searching Authority for International Application No. PCT/EP2016/070618; International Filing Date: Sep. 1, 2016; dated Oct. 5, 2016; 5 Pages.

* cited by examiner

*Primary Examiner* — Jacob T Minskey
*Assistant Examiner* — Adrien J Bernard
(74) *Attorney, Agent, or Firm* — Cantor Colburn LLP

(57) ABSTRACT

The present invention relates to a process for the production of a stretch film comprising a) providing a film web comprising a center portion comprising linear low density polyethylene (LLDPE) and edge portions comprising low density polyethylene (LDPE) using an encapsulation die, b) solidifying the film web to obtain a solidified film web comprising a solidified center portion comprising LLDPE and solidified edge portions comprising LDPE and c) removing the solidified edge portions from the solidified film web to obtain the stretch film.

17 Claims, No Drawings

PROCESS FOR THE PRODUCTION OF STRETCH FILM

CROSS REFERENCE TO RELATED APPLICATIONS

This application is a 371 of International Application No. PCT/EP2016/070618, filed Sep. 1, 2016, which claims priority to European Application No. 15184090.7, filed Sep. 7, 2015 which are incorporated herein by reference in their entirety.

The present invention relates to a process for the production of a stretch film.

Stretch films are widely used in a variety of bundling and packaging applications. The term "stretch film" indicates films capable of stretching and applying a bundling force, and includes films stretched at the time of application as well as "pre-stretched" films, i.e., films which are provided in a pre-stretched form for use without additional stretching. Stretch films can be monolayer films or multilayer films, and can include cling-enhancing additives such as tackifiers, and non-cling or slip additives, as desired, to tailor the slip/cling properties of the film. Typical polymers used in the cling layer of conventional stretch films include, for example, ethylene vinyl acetate, ethylene methyl acrylate, and very low density polyethylenes having a density of less than about 0.912 g/cm$^3$.

The application of polyethylene films in stretch wrapping has been considerably enhanced by the use of linear low density polyethylene (LLDPE) type products. When formed into a film for stretch wrap application, LLDPE products typically combine a high extensibility with good mechanical properties to provide a wrapping or collation function to be achieved in an economic and effective manner. In this respect, LLDPE has significant advantages over low density polyethylene (LDPE) which, due to both its behavior in extension and its mechanical performance, is not normally regarded as a product of choice for stretch wrapping applications, as described in US 20120219814.

There is recently a high demand for a higher production speed of a stretch film. The typical production speed of the stretch film of 500 m/min has been increased to 600 m/min or even 700 m/min. The higher production speed induces instability in the process, such as breaking of the film.

It is an object of the present invention to provide a process for the production of a stretch film in which above-mentioned and/or other problems are solved.

Accordingly, the present invention provides a process for the production of a stretch film comprising:
a) providing a film web comprising a center portion comprising linear low density polyethylene (LLDPE) and edge portions comprising low density polyethylene (LDPE) using an encapsulation die,
b) solidifying the film web to obtain a solidified film web comprising a solidified center portion comprising LLDPE and solidified edge portions comprising LDPE and
c) removing the solidified edge portions from the solidified film web to obtain the stretch film.

An encapsulation die is herein understood to mean a die capable of extruding a web formed from a center portion and two edge portions which join the center web portion at the two edges of the center web portion side-by-side. The edge portions are also commonly referred in the art as "trims". The center portion and two edge portions are extruded side-by-side such that their edges join and co-mingle to form a single web. Such die is commercially available e.g. from Cloeren as Encapsulating Deckle System (EDS™). Side-by-side co-extrusion of film is further known e.g. from U.S. Pat. Nos. 4,731,004 and 5,451,357.

Conventionally, stretch films are made using a die which produces a single web, the whole of which is made by LLDPE. The edge portions of an extruded web experience a neck-in and have the highest tendency to break. According to the present invention, the center portion of the film web is primarily made of LLDPE and the edge portions are primarily made of LDPE. LDPE has a higher melt strength than LLDPE and hence the risk of breaking is much lower with the edge portions made of LDPE than edge portions made of LLDPE.

An encapsulation die is described in K. R. Frey et. al., *The use of encapsulation dies for processing linear polyolefin resins in extrusion coating*, in Proceedings of the ANTEC, Dallas, 6-10 May 2001. In this document, the encapsulation die successfully stabilized the extrusion coating of low-melt-strength resins like high-density polyethylene (HDPE) and LLDPE by co-extruding small amounts of high-melt-strength resins like low-density polyethylene (LDPE) side-by-side, i.e. encapsulating the low-melt strength in the center.

This document relates to extrusion coating, in which a substrate is provided with a coating made from extruded melted composition. In contrast, the present invention relates to a production of a stretch film made from extruded melted composition. The production of a stretch film does not involve the use of a substrate.

According to the invention, the web is solidified and subsequently cut so that the solidified edge portions made of LDPE are removed. Since no substrate is used as in the production of extrusion coating, the removed solidified edge portions may advantageously be recycled for the production of the stretch film. The amount of the removed edge portions is small compared to the amount of the center portion. Therefore, the removed edge portions may be recycled to the feed of the center portion without substantially influencing the composition of the feed of the center portion.

EP1935909 describes LLDPE films which may be used as stretch films. Krumm K, Plastics, Rubber and Composites Processing and Applications, Vol. 20, no. 4, p. 193-200 describes the production of LLDPE stretch-wrapping cast film. Neither document discloses the production of a stretch film from a film web comprising a center portion comprising LLDPE and edge portions comprising LDPE using an encapsulation die.

Step a)

According to the process of the invention, a film web comprising a center portion comprising linear low density polyethylene (LLDPE) and edge portions comprising over low density polyethylene (LDPE) is provided using an encapsulation die.

Film Web

The film web comprises a center portion and two edge portions. The amount of the center portion is typically 80-95 wt %, more typically 85-90 wt %, of the film web and the amount of the two edge portions is typically 20-5 wt %, more typically 15-10 wt %, of the film web. The amounts are calculated as the solidified film web.

Center Portion

The major portion of the center portion is LLDPE, but the center portion may comprise other components besides LLDPE. For example, it may further comprise additives, for example additives as described herein, and/or other polymers, for example other polyolefins, for example low density polyethylene and/or plastomers.

In particular, the center portion may comprise LDPE which has been recycled from the edge portions of the solidified film web.

Preferably, the amount of the LLDPE in the center portion is at least 90 wt %, at least 95 wt %, at least 98 wt %, at least 99 wt % or 100 wt %.

The center portion may have a monolayer structure or a multilayer structure.

In the context of the invention with 'multilayer' film is meant that the film comprises at least five layers, for example five, six, seven, eight, nine, ten, eleven or twelve layers. Preferably, for ease of production, the amount of layers in the multi-layer film is uneven, for example the amount of layers in the multilayer film is five, seven, nine or eleven.

When the center portion has a multilayer structure, each of the layers may have different compositions. The compositions of layers in a multilayer stretch film are well-known, for example as described in US20120219814.

The center portion may also contain appropriate amounts of other additives such as for example fillers, antioxidants, pigments, (UV-)stabilizers, antistatic agents and polymers depending on the specific use of the multi-layer film. Typically, additives may be present in a layer in an amount of 10 to 10000 ppm, for example in an amount of 100 to 5000 ppm based on the layer.

Edge Portions

The major portion of the edge portions is LDPE, but the center portion may comprise other components besides LDPE. For example, it may further comprise additives, for example additives as described herein, and/or other polymers, for example other polyolefins, for example linear low density polyethylene and/or plastomers.

It is possible that the edge portions comprise LLDPE which has been recycled by the edge portions of the solidified film web. However, preferably, the edge portions of the solidified film web are preferably not recycled in a feed for the center portion.

Preferably, the amount of the LDPE in the edge portions is at least 90 wt %, at least 95 wt %, at least 98 wt %, at least 99 wt % or 100 wt %.

LDPE and LLDPE

The production processes of LDPE and LLDPE are summarised in Handbook of Polyethylene by Andrew Peacock (2000; Dekker; ISBN 0824795466) at pages 43-66. The catalysts can be divided in three different subclasses including Ziegler Natta catalysts, Phillips catalysts and single site catalysts. The latter class is a family of different classes of compounds, metallocene catalysts being one of them. As elucidated at pages 53-54 of said Handbook a Ziegler-Natta catalysed polymer is obtained via the interaction of an organometallic compound or hydride of a Group I-III metal with a derivative of a Group IV-VIII transition metal. An example of a (modified) Ziegler-Natta catalyst is a catalyst based on titanium tetra chloride and the organometallic compound triethylaluminium. A difference between metallocene catalysts and Ziegler Natta catalysts is the distribution of active sites. Ziegler Natta catalysts are heterogeneous and have many active sites. Consequently polymers produced with these different catalysts will be different regarding for example the molecular weight distribution and the comonomer distribution.

With linear low density polyethylene (LLDPE) as used herein is meant a low density polyethylene copolymer comprising ethylene and a C3-C10 alpha-olefin comonomer (ethylene-alpha olefin copolymer). Suitable alpha-olefin comonomers include 1-butene, 1-hexene, 4-methyl pentene and 1-octene. The preferred comonomer is 1-hexene. Preferably, the alpha-olefin comonomer is present in an amount of about 5 to about 20 percent by weight of the ethylene-alpha olefin copolymer, more preferably an amount of from about 7 to about 15 percent by weight of the ethylene-alpha olefin copolymer.

Typically, the LLDPE has a density of 915-940 kg/m$^3$ as measured according to ISO1872-2. Preferably, the LLDPE has a density of 930-940 kg/m$^3$, more preferably 932-937 kg/m$^3$ as measured according to ISO1872-2.

Preferably, the melt flow index of the LLDPE ranges from 0.1 to 4 g/10 min, for example from 0.3 to 3 g/10 min, for example from 0.2 to 2 g/10 min, for example from 0.5 to 1.5 g/10 min. For purpose of the invention, the melt flow index is determined herein using ISO1133:2011 (190° C./2.16 kg).

The technologies suitable for the LLDPE manufacture include but are not limited to gas-phase fluidized-bed polymerization, polymerization in solution, and slurry polymerization.

According to a preferred embodiment of the present invention the LLDPE has been obtained by gas phase polymerization in the presence of a Ziegler-Natta catalyst. According to another preferred embodiment, the LLDPE may be obtained by gas phase polymerization in the presence of a metallocene catalyst.

The LLDPE in the center portion of the web may be made of a single type of LLDPE or a mixture of different types of LLDPE having different densities.

Typically, the low density polyethylene (LDPE) has a density of 915-932 kg/m$^3$ as measured according to ISO1872-2. Preferably, the LDPE has a density of 918-928 kg/m$^3$, for example 918-922 kg/m$^3$ or 923-928 kg/m$^3$, as measured according to ISO1872-2.

It is herein understood that the term 'LDPE' includes both an LDPE homopolymer and an LDPE copolymer. The LDPE copolymer is a copolymer of ethylene and a suitable comonomer well known to the skilled person, such as alkenes, cycloalkenes and dienes. Suitable comonomers include α-olefins with 3-12 C atoms, ethylenically unsaturated carboxylic acids, ethylenically unsaturated C4-15 carboxylic acid esters or their anhydrides. Examples of suitable α-olefins to be applied as a comonomer are propylene and/or butene. Examples of suitable ethylenically unsaturated carboxylic acids are maleic acid, fumaric acid, itaconic acid, acrylic acid, methacrylic acid and/or crotonic acid. Examples of ethylenically unsaturated C4-15 carboxylic acid esters or their anhydrides are methyl(meth)acrylate, ethyl(meth)acrylate, hydroxyethyl (meth)acrylate, hydroxypropyle(meth)acrylate, n-butyl methacrylate, vinyl acetate, methacrylic acid anhydride, maleic acid anhydride, 1,4-butanedioldimethacrylate, hexanediol dimethacrylate, 1,3-butylene glycol dimethacrylate, ethylene glycol dimethacrylate, dodecanediol dimethacrylate, trimethylol propane trimethacrylate, trimethacrylate ester and/or itaconic acid anhydride. Also bifunctional alkadienes for example 1,5-hexadiene, 1,7-octadiene, 1,9-decadiene and 1,13-tetradecadiene may be applied. The quantity of comonomer in the polymer is dependent on the desired application.

The LDPE applied in the present film may be produced by use of autoclave high pressure technology or by tubular reactor technology.

Preferably, the melt flow index of the LDPE ranges from 0.1 to 10 g/10 min, for example 1 to 9 g/min or 1.5 to 8 g/min. More preferably, the melt flow index of the LDPE ranges from 3 to 7 g/10 min. In such range, the balance between the drawability and the melt strength of LDPE is optimal for the process of the invention. As described elsewhere, the melt strength of LDPE used for the edge portions is important for reducing the risk of breakage. The drawability of LDPE determines the draw ratio of the film that can be applied in the process. For purpose of the invention, the melt flow index is determined herein using ISO1133:2011 (190° C./2.16 kg).

When the LDPE is an LDPE copolymer, the amount of the comonomer in the LDPE may typically be 0.001-0.500 mol %, preferably 0.008-0.200 mol %, more preferably 0.010-0.100 mol %, relative to the amount of the LDPE.

Preferably, the comonomer in the LDPE copolymer is a di- or higher functional (meth) acrylate, more preferably is a difunctional (meth)acrylate. Preferred di(meth)acrylates are 1,4-butanedioldimethacrylate (BDDMA), hexanediol dimethacrylate (HDDMA), 1,3-butylene glycoldimethacrylate (1,3-BGDMA), ethylene glycol dimethacrylate (EGDMA), dodecanediol dimethacrylate (DDDMA), trimethylol propane trimethacrylate (TMPTMA) and/or trimethacrylate ester (TMA ester). Most preferably, the comonomer in the LDPE is BDDMA. An LDPE copolymer with such comonomer leads to an optimal balance between the drawability and the melt strength of LDPE.

In particularly preferred embodiments, the LDPE copolymer is prepared by a process in which the polymerisation takes place in a tubular reactor at a peak temperature between 290° C. and 350° C., the comonomer is a di- or higher functional (meth) acrylate and the comonomer is applied in an amount between 0.008 mol % and 0.200 mol % relative to the amount of LDPE copolymer. Such LDPE copolymer is described in WO2006094723, incorporated herein by reference. An LDPE copolymer with such comonomer leads to an optimal balance between the drawability and the melt strength of LDPE.

The LDPE in the edge portions of the web may be made of a single type of LDPE or a mixture of different types of LDPE having different densities.

Step b)

The film web is solidified to provide a solidified web having a portion formed by the solidification of the center portion of the film web (a solidified center portion) and portions formed by the solidification of the edge portions of the film web (solidified edge portions). The solidified center portion comprises LLDPE. The solidified edge portions comprise LDPE.

The solidification of a film web is well-known in the art and is not described herein in detail. The solidification involves drawing of the film web. Due to the fact that the edge portions of the film web comprises LDPE, the drawing can be done according to the invention without a high risk of breaking of edge portions which are most susceptible to breakage.

The solidified film web comprises a solidified center portion and two solidified edge portions. The amount of the solidified center portion is typically 80-95 wt %, more typically 85-90 wt %, of the solidified film web and the amount of the two solidified edge portions is typically 20-5 wt %, more typically 15-10 wt %, of the solidified film web.

Step c)

After the film web has been solidified, the solidified edge portions are removed, typically by cutting away the solidified edge portions.

It is possible to remove only the solidified edge portions. This can be done by cutting the solidified film web at the borders between the solidified center portion and the solidified edge portions.

It is also possible to remove the solidified edge portions and a part of the solidified center portion. This can be done by cutting the solidified film web at lines within the solidified center portion. From practical point of view, this more easily ensures that the whole of the solidified edge portions is removed from the solidified film web. Preferably, the amount of the solidified center portion removed is not large. Preferably, at least 95 wt % of the solidified center portion is in the final stretch film.

Preferably, 5-20 wt % of the solidified film web is removed in step c).

Step d)

Preferably, the process further comprises the step of d) recycling the removed solidified edge portions for step a). In this step, the removed edge portions are recycled to a feed for forming the film web.

Preferably, step d) involves recycling the removed edge portions only to a feed for forming the center portion of the film web. This is preferable since the recycling to the feed for forming the center portion of the film web does not substantially influence the composition due to the relatively small amount of the recycled removed edge portions with respect to the fresh feed for forming the center portion. When the center portion of the film web has a multilayer structure, the removed edge portions may be recycled to a feed for forming only one layer or for forming a plurality of layers.

Thickness

The stretch film according to the invention may have a thickness of e.g. 10 to 100 μm, for example from 20 to 50 μm.

The invention further relates to the stretch film obtained or obtainable by the process according to the invention.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXPERIMENTS

The melt strength and the draw down ratio of a number of LLDPE and LDPE were measured.

The LLDPE and LDPE subjected to the measurements are described as summarized in Table 1, as well as the results.

TABLE 1

| kind of polymer | LLDPE1 | LLDPE2 | LLDPE3 | LLDPE4 | LDPE1 | LDPE2 | LDPE3 |
|---|---|---|---|---|---|---|---|
| comonomer | butene | butene | hexene | octene | none | none | BDDMA |
| comonomer content (weight/weight) | 4.5% | 4% | 4% | 4-5% | — | — | 0.41% |
| density (kg/m3) | 430 | 918 | 935 | 935 | 926 | 925 | 920 |
| MFI (dg/min) | 4.2 | 2.8 | 2.8 | 3.5 | 1.9 | 1.9 | 5 |
| Melt strength (cN) | 0.36 | 0.85 | 0.97 | 0.97 | 3.4 | 4.08 | 3.71 |
| Draw Down Ratio | >107 | >107 | >107 | >107 | 68 | 58 | 74 |

The density was measured according to ISO1872-2.

The MFI was measured according to ISO1133:2011 (190° C./2.16 kg).

Melt strength and draw down ratio measurements were performed by a high pressure capillary rheometer REOGRAPH RG50 combined with an extensional rheometer Rheotens 71.97, both from Göttfert Werkstoff-Prüfmaschinen GmbH.

Capillary Rheometer REOGRAPH RG50
Experiment Settings:
Barrel 15 mm
Die 30/2 (l/d)
Measuring temperature: 190° C.
V piston 0.05 mm/s
Rheotens Extensional Rheometer Rheotens extensional rheometer measures the extensional properties of polymer melts by drawing a vertical melt strand at a constant pull-off speed or with a linear or exponentially accelerating velocity. Rheotens extensional rheometer measures the force needed to elongate the strand, and calculates elongational stress, draw ratios, rate of elongation and elongational viscosity. The instrument is used in combination with a suitable capillary rheometer where Rheotens extensional rheometer can be located close to the exit of the capillary.

The RHEOTENS measuring instrument features two driven counter rotating wheels that are connected to a very sensitive balance-system. While the measuring process is ongoing, the two wheels—pinching the melt strand in their midst—pull the strand down. It measures the force exerted as the melt strand is pulled at a user-selected speed or acceleration. Max force measured is the melt strength of that polymer in those specific measurements settings.

Experiment Settings.
Acceleration: 1.2 mm/s$^2$
Vo: 2.8 mm/s
Vmax (Vf): 300 mm/s
Max DDR (Draw Down Ratio): 107

It can be understood that LDPE has a much higher melt strength than LLDPE. The measured draw down ratios of LDPE are at an acceptable level. Therefore, LDPE is suitable for providing the edge portions in the process for the production of a stretch film according to the present invention.

In particular, LDPE3 having a comonomer of BDDMA and an MFI of 5 dg/min has a high melt strength (in comparison to LLDPE) and a particularly high draw ratio.

The invention claimed is:

1. A process for the production of a stretch film comprising:
   a) providing a film web comprising a center portion comprising linear low density polyethylene (LLDPE) and edge portions comprising low density polyethylene (LDPE) using an encapsulation die,
   b) solidifying the film web to obtain a solidified film web comprising a solidified center portion comprising LLDPE and solidified edge portions comprising LDPE, and
   c) removing the solidified edge portions from the solidified film web to obtain the stretch film.

2. The process according to claim 1, further comprising the step of d) recycling the removed edge portions for step a).

3. The process according to claim 2, wherein step d) involves recycling the removed edge portions only to a feed for forming the center portion of the film web.

4. The process according to claim 1, wherein the amount of the LLDPE in the center portion of the film web is at least 90 wt %.

5. The process according to claim 1, wherein the amount of the LDPE in the edge portions of the film web is at least 90 wt %.

6. The process according to claim 1, wherein the center portion has a multilayer structure.

7. The process according to claim 1, wherein the LLDPE in the center portion of the film web has a melt flow index of 0.1 to 4 g/10 min as measured according to ISO1133:2011 (190° C./2.16 kg).

8. The process according to claim 1, wherein the LDPE in the edge portions of the film web has a melt flow index of 3 to 7 g/10 min as measured according to ISO1133:2011 (190° C./2.16 kg).

9. The process according to claim 1, wherein the LDPE in the edge portions of the film web is a copolymer of ethylene and a di- or higher functional (meth) acrylate.

10. The process according to claim 1, wherein the LDPE in the edge portions of the film web is an LDPE copolymer prepared by a process in which the polymerisation takes place in a tubular reactor at a peak temperature between 290° C. and 350° C., the comonomer is a di- or higher functional (meth) acrylate and the comonomer is applied in an amount between 0.008 mol % and 0.200 mol % relative to the amount of LDPE copolymer.

11. The process according to claim 1, wherein the amount of the solidified center portion is 80-95 wt % of the solidified film web and the amount of the two edge portions is 20-5 wt % of the solidified film web.

12. The process according to claim 1, wherein the stretch film has a thickness of 10 to 100 μm.

13. The process according to claim 9, wherein the LDPE in the edge portions of the film web is 1,4-butanedioldimethacrylate.

14. The process according to claim 12, wherein the stretch film has a thickness of 20 to 50 μm.

15. The process according to claim 1, wherein the process does not comprise the use of a substrate.

16. The process according to claim 1, wherein the stretch film is produced at a production speed of 600 m/min to 700 m/min.

17. A process for the production of a stretch film comprising:
- a) providing a film web comprising a center portion comprising linear low density polyethylene (LLDPE) and edge portions comprising low density polyethylene (LDPE) using an encapsulation die, wherein the film web is not produced on a substrate,
  wherein the LLDPE is a homopolymer and wherein the amount of the LLDPE in the center portion of the film web is at least 90 wt %,
  wherein the LDPE in the edge portions of the film web is a copolymer of ethylene and a di- or higher functional (meth) acrylate, and wherein the amount of the LDPE in the edge portions of the film web is at least 90 wt %,
- b) solidifying the film web to obtain a solidified film web comprising a solidified center portion comprising LLDPE and solidified edge portions comprising LDPE,
- c) removing the solidified edge portions from the solidified film web to obtain the stretch film, and
- d) recycling the removed edge portions that are free of any substrate to a feed for forming the center portion of the film web.

* * * * *